United States Patent
Nishida et al.

(10) Patent No.: US 7,418,723 B2
(45) Date of Patent: Aug. 26, 2008

(54) OPTICAL PICKUP DEVICE AND OPTICAL DISK RECORD/PLAYBACK DEVICE FOR REDUCING THE SIZE OF THE RECORD/PLAYBACK DEVICE

(75) Inventors: Hiroto Nishida, Ishikawa (JP); Kazunori Hasegawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 395 days.

(21) Appl. No.: 10/995,706

(22) Filed: Nov. 23, 2004

(65) Prior Publication Data
US 2005/0114878 A1 May 26, 2005

(30) Foreign Application Priority Data
Nov. 26, 2003 (JP) .................. P2003-394950

(51) Int. Cl.
*G11B 17/22* (2006.01)
*G11B 5/55* (2006.01)
(52) U.S. Cl. .................. 720/662; 720/676
(58) Field of Classification Search ........ 369/30.95, 369/44.19, 44.11, 44.14, 44.17, 44.18; 720/662, 720/690, 673–676, 605; 360/265.9, 266.1, 360/265.6
See application file for complete search history.

(56) References Cited

U.S. PATENT DOCUMENTS 5,682,364 A * 10/1997 Ogawa ................ 369/30.81
5,917,787 A * 6/1999 Tsuchiya et al. ......... 369/30.81
6,198,719 B1 * 3/2001 Faruque et al. ............. 370/209
6,724,713 B1 * 4/2004 Watanabe et al. ........... 720/619
6,990,675 B2 * 1/2006 Suzuki et al. ............... 720/672
7,093,269 B2 * 8/2006 Murotani ................... 720/605
2001/0012260 A1   8/2001 Tamiya et al.
2001/0017839 A1 * 8/2001 Suzuki et al. ............... 369/192
2003/0047388 A1 * 3/2003 Faitel ........................ 187/214
2004/0111731 A1 * 6/2004 Suzuki et al. ............... 720/624
2004/0257710 A1 * 12/2004 Limmer et al. ........... 360/264.3
2006/0053431 A1 * 3/2006 Nakade et al. .............. 720/662

FOREIGN PATENT DOCUMENTS

JP    2002-109810    4/2002
JP    2002-210981    7/2002

OTHER PUBLICATIONS

European Search Report for Application No. EP 04 02 772, dated Sep. 25, 2007.

* cited by examiner

*Primary Examiner*—Brian E. Miller
*Assistant Examiner*—Matthew G Kayrish
(74) *Attorney, Agent, or Firm*—RatnerPrestia

(57) ABSTRACT

Space for an optical pickup at a position set aside from a disk accommodating section is to be compressed, thereby to reduce an overall size of an optical pickup device. For such a purpose, the optical pickup unit is held by a screw shaft and a guide shaft parallel to each other, and the screw shaft, the guide shaft, a first connecting plate and a second connecting plate constitute a quadrilateral parallel link. The screw shaft and a chassis holding a turntable are oscillated by a driving motor pivoting on the first connecting plate. In an escape position in which the optical pickup device is away from the disk accommodating section, a gap between the screw shaft and the guide shaft is narrowed.

8 Claims, 5 Drawing Sheets

OPTICAL PICKUP DEVICE AND OPTICAL DISK RECORD/PLAYBACK DEVICE FOR REDUCING THE SIZE OF THE RECORD/PLAYBACK DEVICE

BACKGROUND OF THE INVENTION

1. Field of the Invention

The present invention relates to an optical pickup device and an optical disk record/playback device for recording or reproducing data onto or from an optical disk such as a compact disc(CD) or a digital versatile disc (DVD).

2. Description of the Prior Art

A changer-type optical disk record/playback device, which is an optical disk record/playback device according to the prior art, is provided with a disk accommodating section 100 having a plurality of trays arranged to be slidable in a direction perpendicular to the surface of the drawing as shown in FIG. 1, and a disk mounted on one or another of the trays is selected by driving the tray in the axial direction and positioned in its record/playback position. Outside the disk accommodating section 100, an optical pickup device 101 is selectively placed around a spindle 102 in an escape position P1 or a working position P2. The optical pickup device 101 is provided with a chassis 103 fixed to the spindle 102, a screw shaft 104 rotatably fixed to the chassis 103, a guide shaft 105 arranged on the chassis 103 in parallel to the screw shaft 104, an optical pickup 106 disposed slidably on the screw shaft 104 and the guide shaft 105, and a turntable 107 for holding and turning a disk. The screw shaft 104 is turned by a feed motor (not shown). The optical pickup 106 is provided with a photo-unit 106a such as an objective lens or an optical detector, directed upward.

When the user gives the reference number of the desired disk tray, the pertinent tray in the disk accommodating section 100 is selected, and the disk on the tray is placed in a prescribed record/playback position. Then, as the user presses the record/playback button, a driving motor 108 turns the spindle 102, and the optical pickup device 101 shifts from the escape position P1 to the working position P2. The disk on the tray is held on the turntable 107, and turned by a spindle motor. Rotational driving of the screw shaft 104 by the feed motor (not shown) causes the optical pickup 106 to shift from the central part to the periphery of the disk to read signals recorded on, or to record signals onto, the disk. Upon completion of recording onto or playback of the disk, the optical pickup 106 returns to its initial position, and the optical pickup device 101 also returns to its escape position P1.

It is a trend prevalent in recent years to require such optical disk record/playback devices to be reduced in size, and attempts are being made to reduce the size and weight of the above-described configuration. The usual arrangement previously was to shift a disk stored in a disk accommodating section to the record/playback position and to accomplish recording or playing back with an optical pickup device fixed in position. The above-described configuration in which, conversely, the position of the disk accommodating section is fixed and the optical pickup device is shifted, the overall size of the optical disk record/playback device can be reduced, and attempts are continued for further reduction in size (see, for instance, the Japanese Published Unexamined Patent Application No. 2002-109810).

However, the product of any such prior attempt at size reduction requires, when the optical pickup device escapes from the disk accommodating section, much of the movable range of the optical pickup device for its escape space, resulting in a problem of restricting any further reduction in device size.

SUMMARY OF THE INVENTION

An object of the present invention, undertaken to solve this problem with the prior art, is to provide an optical disk record/playback device and an optical pickup device permitting reduction in space to be set aside for letting the optical pickup escape from a disk accommodating section and enabling the whole device to be reduced in size.

An optical pickup device according to the invention includes an optical pickup unit which is linearly reciprocated by a screw shaft. The screw shaft is held by a chassis and is driven and guided by a guide shaft. The guide shaft is arranged substantially in parallel to the screw shaft. The optical pickup device also includes a parallel link comprising the screw shaft, the guide shaft and connecting means. The connecting means includes one end that is rotatably connected to the screw shaft and another end that is rotatably connected to the guide shaft. The optical pickup device further includes link driving means for oscillating the parallel link.

In this configuration, oscillation of the parallel link by the link driving means pivoting on the connecting means enables the disk turning means held by the chassis to place a disk arranged in a disk accommodating section either in its working position for recording and playing back and an escape position away from the disk accommodating section. Furthermore, as the width of the parallel link is narrowed in the escape position, no large escape space is required, and the overall size of the device can be reduced.

The aforementioned object and advantages of the present invention will become more apparent from the following description of a preferred embodiment thereof when taken in conjunction with accompanying drawings.

DESCRIPTION OF THE PREFERRED EMBODIMENT

Figure 1:
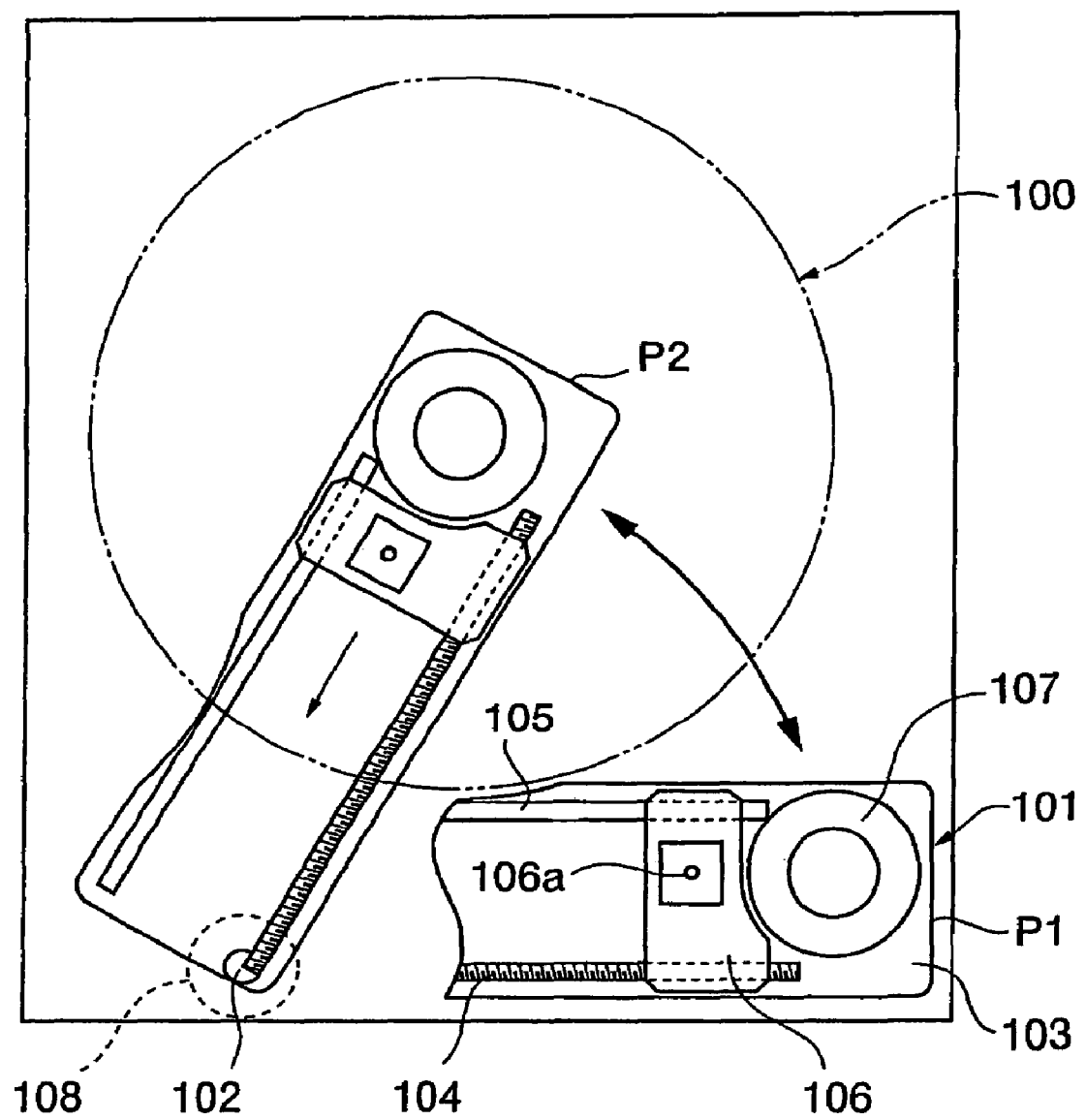
FIG. 1 shows schematic plan of a conventional optical pickup device.
Figure 2:
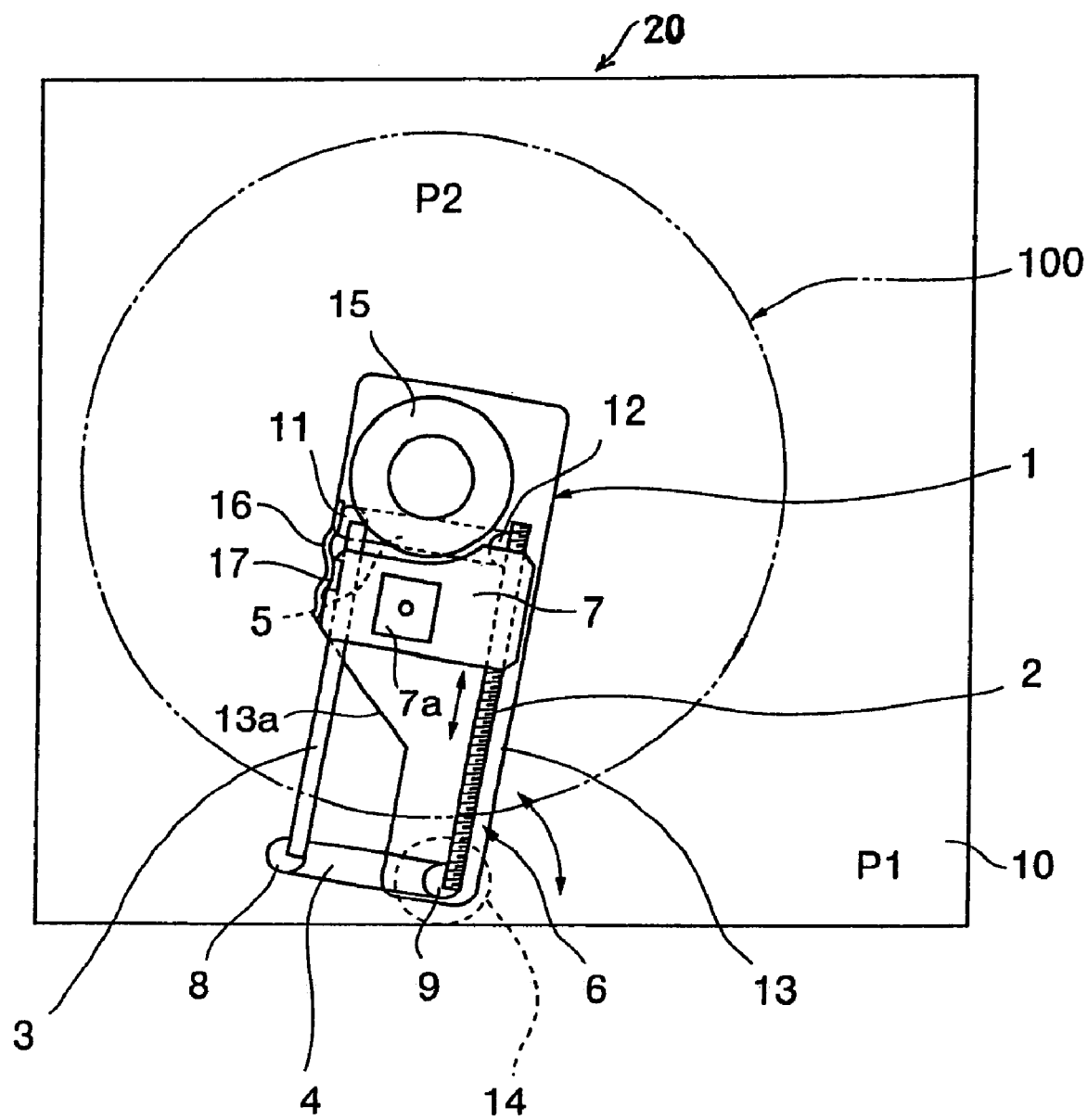
FIG. 2 shows a plan of an optical pickup device, which is a preferred embodiment of the invention, in its working position P2.

The optical pickup device, which is the preferred embodiment of the invention, will be described below with reference to drawings. FIG. 2 shows a schematic configuration of the optical pickup device embodying the invention in this mode. Referring to FIG. 2, within a changer-type optical disk record/playback device 20, a disk accommodating section 100 has a plurality of trays arranged to be slidable in a direction perpendicular to the surface of the drawing, and a disk which the user wishes to play back is mounted on each of the trays. Outside the disk accommodating section 100, there is arranged a spindle around which an optical pickup device 1 turns. The optical pickup device 1 is provided with a quadrilateral parallel link 6 formed of a screw shaft 2, a guide shaft 3, a first connecting plate 4 and a second connecting plate 5, and an optical pickup unit 7 which is screwed on to the screw shaft 2 and is linearly reciprocated by the rotation of the screw shaft 2 in its axial direction while being guided by the guide shaft 3. The optical pickup unit 7 is provided with a photo-unit 7*a* such as an objective lens or an optical detector, directed upward.

Figure 4:
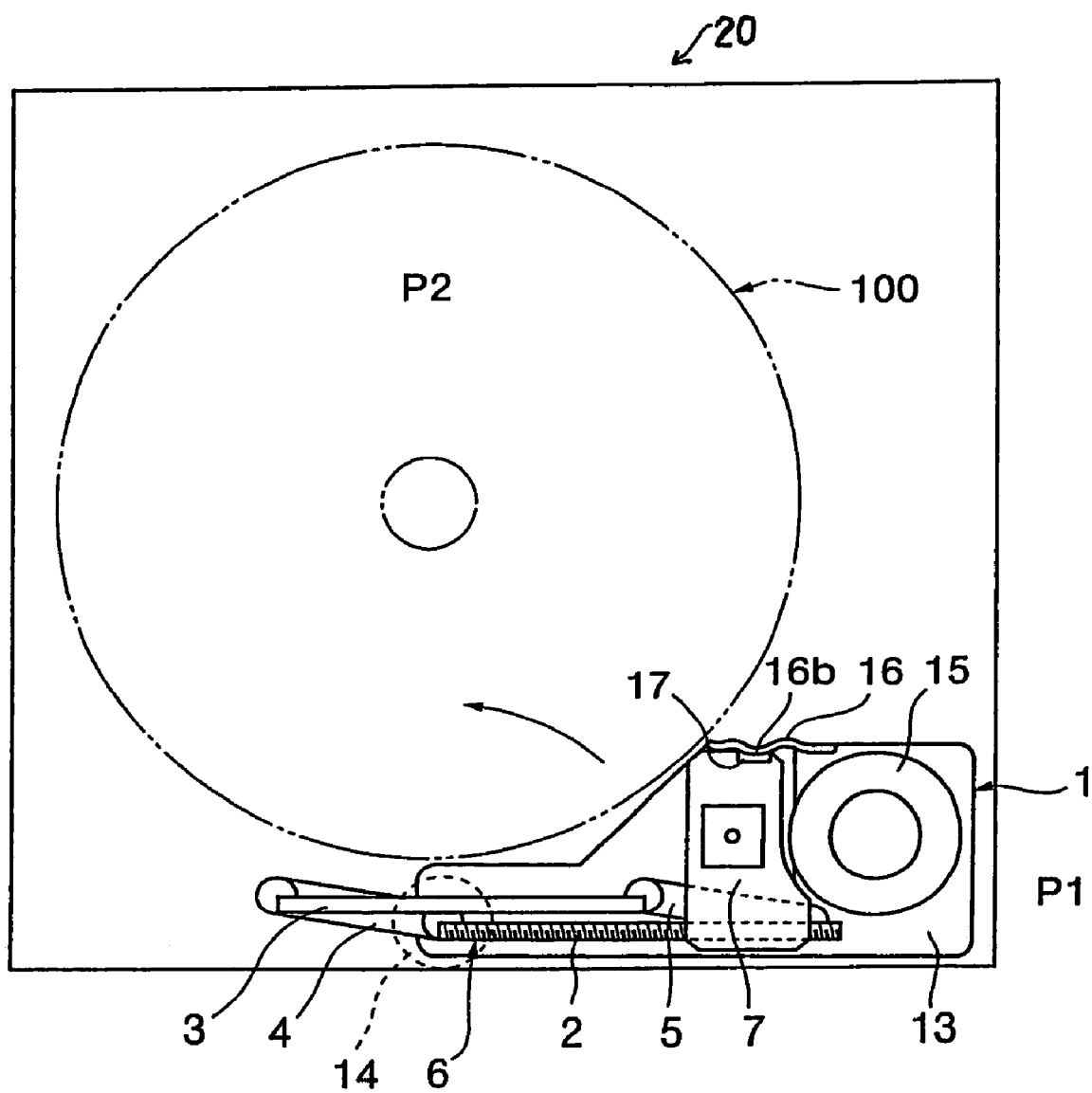
FIG. 4 shows a plan of the optical pickup device, which is the preferred embodiment of the invention, in its escape position P1.
Figure 5:
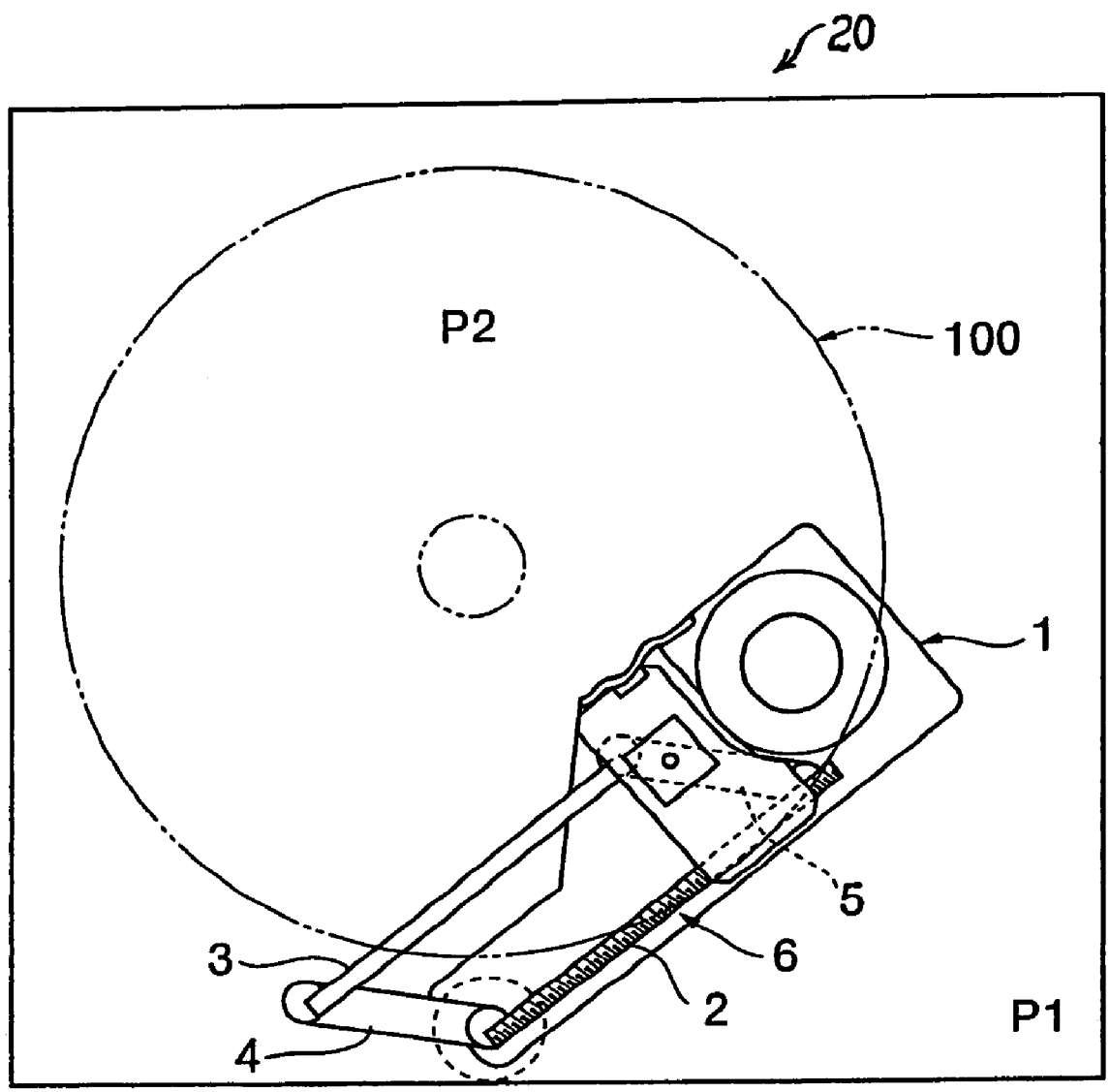
FIG. 5 shows a plan of the optical pickup device, which is the preferred embodiment of the invention, when in transit from the escape position P1 to the working position P2.

The first connecting plate 4 of the parallel link 6 is fixed at a position relative to a base 10 at two points of fixed rotation shafts 8 and 9. The second connecting plate 5 is rotatably connected by floating rotation shafts 11 and 12 to the guide shaft 3 and the screw shaft 2, respectively. The fixed rotation shaft 8 rotatably holds one end of the guide shaft 3, while the fixed rotation shaft 9 is fixed to a chassis 13 holding the screw shaft 2, and connected to the rotation shaft of a driving motor 14, which is link driving means. Therefore, when the fixed rotation shaft 9 is turned by the driving motor 14, the chassis 13 oscillates pivoting on the first connecting plate 4. The metal plate-made chassis 13 has a cut portion 13*a* on the guide shaft 3 side toward a supporting point. The purpose of the cut portion is not to allow, when the optical pickup device 1 is in the escape position P1 as shown in FIG. 4, the chassis 13 to prevent the tray of the disk accommodating section 100 from shifting. Toward the tip of the chassis 13, a turntable 15, which is the means of turning the disk, is disposed, and a spindle motor (not shown) is arranged behind it.

Figure 3:
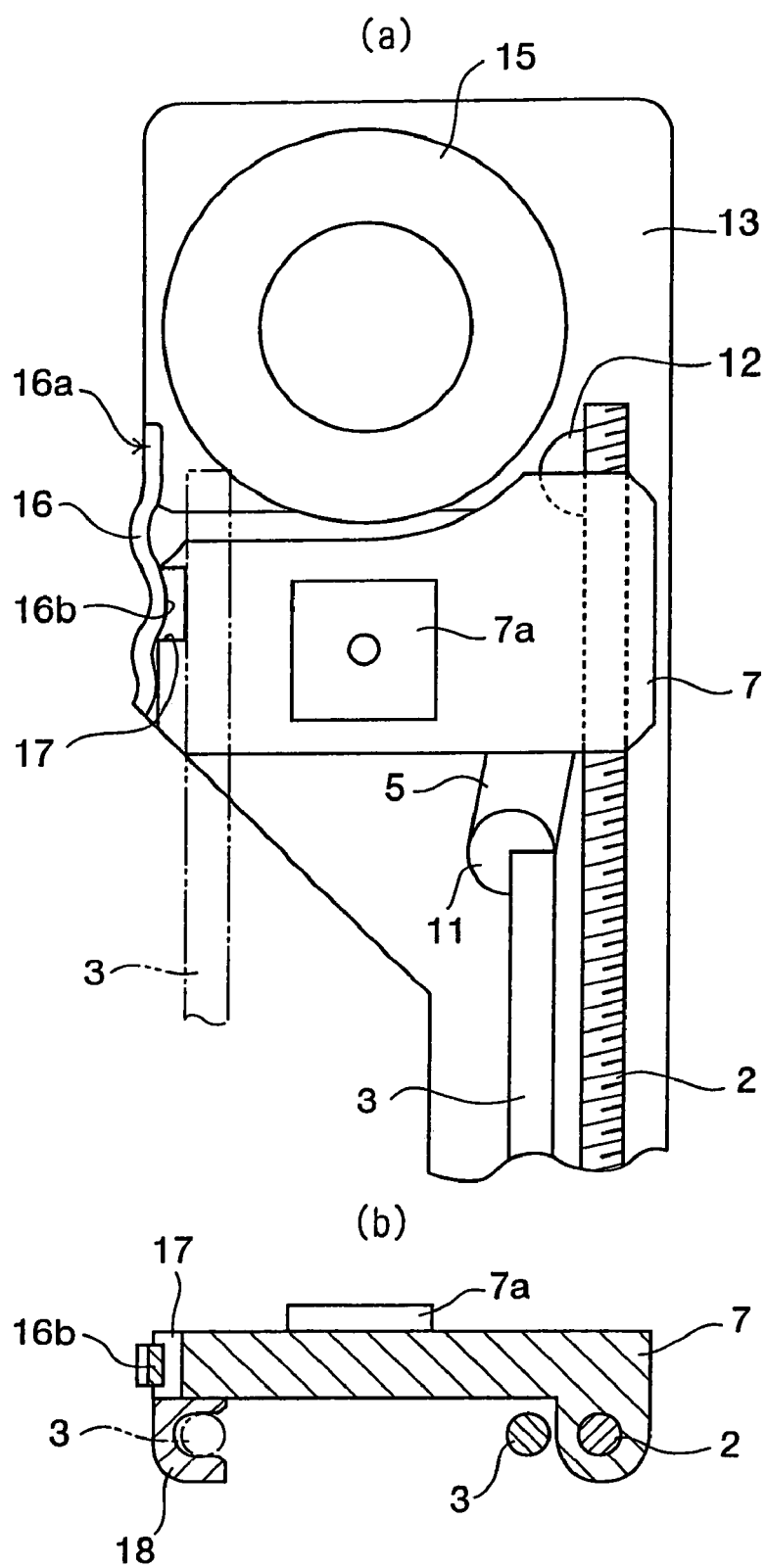
FIG. 3A shows an enlarged partial plan of the essential part of the optical pickup device, which is the preferred embodiment of the invention.
FIG. 3B shows an enlarged partial section of the optical pickup device, which is the preferred embodiment of the invention.

FIG. 3 show expanded views of the tip of the optical pickup device 1. Referring to FIG. 3A, the base end 16*a* of a lock spring 16, which is the locking means, is fixed to a side of the disk accommodating section 100 at the tip of the chassis 13. The lock spring 16, which is a leaf spring, is corrugated, and the engagement of a convex 16*b* in the middle with an engaging hole 17 bored in a side of the optical pickup unit 7 serves to fix the optical pickup unit 7 to the chassis 13. This fixed position is located deeper than the starting position of the optical pickup unit 7 for recording or playing back, and the optical pickup unit 7 starts the operation for recording or playing back after moving out of this initial position. Further as shown in FIG. 3B, an engaging hook 18, which is fixing means, is fixed to the under face of the optical pickup unit 7 and, by being snapped onto the guide shaft 3, which is in the working position, fixes the guide shaft 3.

The operations of the optical pickup device configured as described above will be described below with reference to FIG. 2 through FIG. 5. In the state shown in FIG. 4, the optical pickup device 1 is in the escape position P1, and the parallel link 6 is folded by the driving motor 14 pivoting on the first connecting plate 4. In this state, the optical pickup unit 7 is locked by the engagement of the convex 16*b* of the lock spring 16 and the engaging hole 17 with each other. When the chassis 13 is turned counterclockwise from this state by the driving motor 14, the parallel link 6 shifts in the same direction pivoting on the first connecting plate 4 to gradually widen the gap between the guide shaft 3 and the screw shaft 2 to reach the state shown in FIG. 5, and is further turned to be placed in the working position P2 shown in FIG. 2. In this working position P2, the gap between the guide shaft 3 and the screw shaft 2 is expanded to the maximum in the parallel link 6, and the guide shaft 3 is snapped into the engaging hook 18 as shown in FIG. 3B. A micro-switch senses the arrival of the parallel link 6 in this working position P2 and stops the turning of the driving motor 14. Then, a selected tray from the disk accommodating section 100 shifts to the record/playback position, and the disk on that tray is mounted on the turntable 15. The turntable 15 is turned by the spindle motor, and the screw shaft 2 is turned by the feed motor to release the optical pickup unit 7 from its initial position. As a result, the lock spring 16 and the engaging hole 17 are disengaged from each other, and the optical pickup unit 7 shifts outward in the radial direction of the turntable 15 to enable signals to be recorded onto or reproduced from the disk on the turntable 15.

Upon completion of recording or playing back, the feed motor is reversed by a detection signal from the micro-switch, the optical pickup unit 7 shifts inward in the radial direction of the turntable 15, and the engaging hole 17 engages with the lock spring 16 to fix the optical pickup unit 7 in its initial position. Then, the driving motor 14 is reversed by another detection signal from the micro-switch, and the chassis 13 shifts toward the escape position P1 shown in FIG. 4 and is stopped by still another detection signal from the micro-switch in the position shown in FIG. 4.

As described so far, since in the optical pickup device embodying the invention in this mode the optical pickup unit 7 is held by the screw shaft 2 and the guide shaft 3 which are parallel to each other, the quadrilateral parallel link 6 is formed of the screw shaft 2, the guide shaft 3, the first connecting plate 4 and the second connecting plate 5, the chassis 13 holding the parallel link 6 and the turntable 15 is oscillated by the driving motor 14 pivoting on the first connecting plate 4, and the gap between the screw shaft 2 and the guide shaft 3 is narrowed in the escape position P1 in which the optical pickup device 1 is away from the disk accommodating section 100, no large escape space is needed in the escape position P1 of the optical pickup unit 7, and this enables the whole device to be reduced in size. Therefore, by applying this optical pickup device to the changer-type optical disk record/playback device 20, the depth in the direction of disk insertion can be made shallower, and this makes a further contribution to reducing the size of the optical disk record/playback device.

In the embodiment of the invention described above, the locking means using the lock spring 16 and the engaging hole 17 as well as the fixing means using the engaging hook 18 can be modified in various ways by use of other known features of the prior art.

Although the quadrilateral parallel link is formed of the screw shaft, the guide shaft 3, and the two connecting plates in the foregoing embodiment, the parallelism between the screw shaft and the guide shaft can also be maintained by one connecting plate and a guide shaft angle control means provided on this connecting plate instead of using two connecting plates.

As hitherto described, since the parallel link is formed of the screw shaft, guide shaft and connecting means supporting the optical pickup unit and this parallel link is oscillated by link driving means in the optical pickup device pertaining to the invention, there can be provided a compact optical pickup device having the advantage that the width of the parallel link can be narrowed in the escape position and accordingly the escape space is compressed. It can be effectively applied to optical disk record/playback devices and the like reduced in size.

Further, because the parallel link is constructed in a quadrilateral shape, the parallelism between the screw shaft and the guide shaft is maintained stable.

The optical pickup device according to the invention allows the guide shaft to be brought close to the screw shaft in the escape position and the width of the parallel link is thereby narrowed, the overall size of the device can be reduced.

In the optical pickup device according to the invention, since the guide shaft is fixed by the fixing means provided on the chassis in the working position of the disk turning means, the parallel link can be held stable to enable the optical pickup unit to shift smoothly.

In the optical pickup device according to the invention, since the optical pickup unit is fixed to the chassis and thereby made unable to shift when it is not working, the optical pickup unit can be held stable to prevent fluctuations in its characteristics.

An optical disk record/playback device according to the invention makes it possible to realize a compact optical disk record/playback device.

Although the present invention has been described with reference to a preferred embodiment thereof illustrated in accompanying drawings, obviously the invention can be readily altered or modified without deviating from its true spirit and scope. The invention would also cover such alterations and modifications.

What is claimed is:

1. An optical pickup device for accessing an optical disc, comprising:
   an optical pickup unit;
   a screw shaft for linearly reciprocating the optical pickup unit;
   a guide shaft arranged substantially in parallel to said screw shaft;
   a chassis for holding the screw shaft;
   an engaging hook fixed to the optical pickup unit and selectively holding said guide shaft;
   a parallel link comprising said screw shaft, said guide shaft and connecting means of which one end is rotatably connected to said screw shaft and another end is rotatably connected to said guide shaft; and
   link driving means for oscillating said parallel link, wherein
   the engaging hook holds said guide shaft when the parallel link is in a working position where the optical pickup unit is capable of accessing the optical disc,
   said guide shaft is released from the engaging hook when the parallel link is in an escape position where the optical pickup unit is not capable of accessing the optical memory.

2. The optical pickup device according to claim 1, wherein said parallel link comprises said screw shaft, said guide shaft, first connecting means rotatably connected to one end of said screw shaft and to one end of said guide shaft, and second connecting means rotatably connected to another end of said screw shaft and to another end of said guide shaft, and said link driving means cause said parallel link to oscillate pivoting on the ends of said first connecting means.

3. The optical pickup device according to claim 1, wherein said guide shaft moves close to and away from said screw shaft.

4. The optical pickup device according to claim 3, wherein when the optical pickup unit moves from the escape position towards the working position, movement of the guide shaft is stopped by the chassis.

5. The optical pickup device according to claim 1, further provided with fixing means for fixing said guide shaft to said chassis.

6. The optical pickup device according to claim 1, further provided with locking means for fixing said optical pickup unit to said chassis.

7. The optical pickup device according to claim 6, wherein the locking means includes:
   a leaf spring including a convex portion disposed on the chassis, and
   an engaging hole defined in the optical pickup unit and configured to accept the convex portion of the leaf spring.

8. An optical disk record/playback device provided with an optical pickup device provided with an optical pickup unit which is linearly reciprocated by a screw shaft held by a chassis and driven and guided by a guide shaft arranged substantially in parallel to said screw shaft, a parallel link comprising said screw shaft, said guide shaft and connecting means of which one end is rotatably connected to said screw shaft and another end is rotatably connected to said guide shaft, and link driving means for oscillating said parallel link, wherein responsive to said optical pickup unit moving to a working position, said ouide shaft moves away from said screw shaft and is stopped by an engaging hook fixed to the optical pickup unit, the working position is a position where the optical pickup unit is capable of accessing the optical disc.

* * * * *